(12) United States Patent
Schoen et al.

(10) Patent No.: US 7,157,915 B2
(45) Date of Patent: Jan. 2, 2007

(54) COMBINED CHARACTERIZATION AND INVERSION OF RESERVOIR PARAMETERS FROM NUCLEAR, NMR AND RESISTIVITY MEASUREMENTS

(75) Inventors: Juergen S. Schoen, Leoben (AT); Otto N. Fanini, Houston, TX (US); Daniel Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/757,051

(22) Filed: Jan. 14, 2004

(65) Prior Publication Data
US 2004/0140801 A1 Jul. 22, 2004

Related U.S. Application Data

(62) Division of application No. 09/928,769, filed on Aug. 13, 2001, now Pat. No. 6,686,736.

(60) Provisional application No. 60/229,134, filed on Aug. 30, 2000.

(51) Int. Cl.
*G01V 3/10* (2006.01)
*G01V 3/00* (2006.01)
*G01V 5/04* (2006.01)
*G01V 3/18* (2006.01)

(52) U.S. Cl. ............... 324/339; 324/303; 324/338; 702/7

(58) Field of Classification Search ............... 324/303, 324/306, 314, 339, 335, 338, 343, 366; 702/2, 702/8; 364/422, 421
See application file for complete search history.

(56) References Cited

U.S. PATENT DOCUMENTS

| | | | | |
|---|---|---|---|---|
| 2,786,178 | A | * 3/1957 | Doll | 324/367 |
| 3,479,581 | A | * 11/1969 | Runge | 324/338 |
| 4,245,313 | A | 1/1981 | Coates | 364/422 |
| 4,719,423 | A | 1/1988 | Vinegar et al. | 324/303 |
| 4,873,488 | A | 10/1989 | Barber et al. | 324/339 |
| 5,349,528 | A | 9/1994 | Ruhovets | 702/7 |
| 5,355,088 | A | 10/1994 | Howard, Jr. | 324/339 |
| 5,463,549 | A | * 10/1995 | Dussan V. et al. | 702/7 |
| 5,656,930 | A | 8/1997 | Hagiwara | 324/339 |
| 5,671,136 | A | 9/1997 | Willhoit, Jr. | 364/421 |
| 5,781,436 | A | 7/1998 | Forgang et al. | 364/422 |
| 5,814,988 | A | 9/1998 | Itskovich et al. | 324/303 |

(Continued)

OTHER PUBLICATIONS

A. Poupon et al.; *A Contribution to Electrical Log Interpretation in Shaly Sands*, Petroleum Branch Fall Meeting, Oct. 19-21, 1953, T.P. 3800, pp. III-113-III-120.

(Continued)

*Primary Examiner*—Diego Gutierrez
*Assistant Examiner*—Tiffany A. Fetzner
(74) *Attorney, Agent, or Firm*—Madan, Mossman & Sriram, P.C.

(57) ABSTRACT

A method of determining the distribution of shales, sands and water in a reservoir including laminated shaly sands using vertical and horizontal conductivities derived from nuclear, NMR, and multi-component induction data such as from a Multicomponent Induction Logging Tool

18 Claims, 8 Drawing Sheets

U.S. PATENT DOCUMENTS

| | | | | |
|---|---|---|---|---|
| 5,854,991 | A | 12/1998 | Gupta et al. | 702/7 |
| 5,936,405 | A | 8/1999 | Prammer et al. | 324/303 |
| 5,966,013 | A | 10/1999 | Hagiwara | 324/339 |
| 6,032,101 | A | 2/2000 | Freedman et al. | 702/8 |
| 6,242,912 | B1 | 6/2001 | Prammer et al. | 324/303 |
| 6,255,819 | B1 | 7/2001 | Day et al. | 364/303 |
| 6,337,568 | B1 | 1/2002 | Tutunji et al. | 324/303 |
| 6,470,274 | B1 | 10/2002 | Mollison et al. | 702/7 |
| 6,493,632 | B1 | 12/2002 | Mollison et al. | 702/7 |
| 6,686,736 | B1 * | 2/2004 | Schoen et al. | 324/303 |
| 2002/0101235 | A1 * | 8/2002 | Schoen et al. | 324/303 |
| 2004/0140801 | A1 * | 7/2004 | Schoen et al. | 324/303 |

OTHER PUBLICATIONS

M.H. Waxman, *Electrical Conductivities in Oil-Bearing Shaly Sands*, SPE 42nd Annual Fall Meeting, Oct. 1-4, 1967, pp. V-145-V160.

J. D. Klein et al.; *The Petrophysics of Electrically Anisotropic Reservoirs*, The Log Analyst, May-Jun., 1997, pp. 25-36; *Technical Note*, Saturation Effects on Electrical Anisotropy, J.D. Klein, Jan.-Feb. 1996, pp. 47-49.

Aytekin Timur; *Open Hole Well Logging*, SPE 10037 International Petroleum Exhibition and Technical Symposium of the Society of Petroleum Engineers, Beijing, Mar. 18-26, 1982, pp. 639-785, 16 Figures.

Philip H. Nelson; *Permeability-Porosity Relationships in Sedimentary Rocks* The Log Analyst, May-Jun. 1994, pp. 38-62, 31 Figures.

M.C. Bowers et al.; *Determination of Porosity Types from BMR Data and Their Relationship to Porosity Types Derived from Thin Section*, SPE 26307, 1993, pp. 1-45, 8 Figures.

J. D. Klein et al.; *The Petrophysics of Electrically Anisotropic Reservoirs*, SPWLA 36th Annual Logging Symposium, Jun. 26-29, 1995, pp. 1-12, 16 Figs.

* cited by examiner

COMBINED CHARACTERIZATION AND INVERSION OF RESERVOIR PARAMETERS FROM NUCLEAR, NMR AND RESISTIVITY MEASUREMENTS

CROSS REFERENCES TO RELATED APPLICATIONS

This application is a divisional application with a priority claim to U.S. patent application Ser. No. 09/928,769 filed on Aug. 13, 2001, now U.S. Pat. No. 6,686,736, which claimed priority from U.S. Provisional Patent Application Ser. No. 60/229,134 filed on Aug. 30, 2000.

BACKGROUND OF THE INVENTION

1. Field of the Invention

The invention is related generally to the field of interpretation of measurements made by well logging instruments for the purpose of determining the fluid content and permeability of earth formations. More specifically, the invention is related to methods for using Nuclear, Resistivity and Nuclear Magnetic Resonance (NMR) measurements and/or measurements made with a formation testing tool or pressure tests made in laminated reservoirs for determining a distribution of sands, shales and fluids in the reservoir and estimating permeability of the reservoir.

2. Background of the Art

A significant number of hydrocarbon reservoirs include deep water turbidite deposits that consist of thin bedded, laminated sands and shales. A common method for evaluating the hydrocarbon content of reservoirs is the use of resistivity measurements. In interpretation techniques known in the art, typically one or more types of porosity-related measurement will be combined with measurements of the electrical resistivity (or its inverse, electrical conductivity) of the earth formations to infer the fluid content within the pore spaces of the earth formations. The fractional volumes of connate water and hydrocarbons can be inferred from empirical relationships of formation resistivity Rt with respect to porosity and connate water resistivity such as, for example, the well known Archie relationship. In the Archie relationship fractional volume of water in the pore space is represented, as shown in the following expression, by Sw—known as "water saturation":

$$S_w^n = \frac{R_0}{R_t} = \frac{1}{R_t}\frac{aR_w}{\phi^m} \qquad (1)$$

where a and m are empirically determined factors which relate the porosity (represented by $\Phi$) to the resistivity of the porous rock formation when it is completely water-saturated ($R_0$), $R_w$ represents the resistivity of the connate water disposed in the pore spaces of the formation, and m represents an empirically determined "cementation" exponent, n is the saturation exponent.

Relationships such as the Archie formula shown in equation (1) do not work very well when the particular earth formation being analyzed includes some amount of extremely fine-grained, clay mineral-based components known in the art as "shale". Shale typically occurs, among other ways, in earth formations as "dispersed" shale, where particles of clay minerals occupy some of the pore spaces in the hydrocarbon-bearing earth formations, or as laminations (layers) of clay mineral-based rock interleaved with layers of reservoir-type rock in a particular earth formation.

In the case of dispersed shale, various empirically derived relationships have been developed to calculate the fractional volume of pore space which is capable of containing movable (producible) hydrocarbons. The fractional volume of such formations which is occupied by dispersed shale can be estimated using such well logging devices as natural gamma ray radiation detectors. See for example, M. H. Waxman et al, "Electrical Conductivities in Oil Bearing Shaly Sands", SPE Journal, vol. 8, no. 2, Society of Petroleum Engineers, Richardson, Tex. (1968).

In the case of laminated shale, the layers sometimes are thick enough to be within the vertical resolution of, and therefore are determinable by, well logging instruments such as a natural gamma ray detector. In these cases, the shale layers are determined not to be reservoir rock formation and are generally ignored for purposes of determining hydrocarbon content of the particular earth formation. A problem in laminated shale reservoirs is where the shale laminations are not thick enough to be fully determined using gamma ray detectors and are not thick enough to have their electrical resistivity accurately determined by electrical resistivity measuring devices known in the art.

Sands that have high hydrocarbon saturation are typically more resistive than shales. In reservoirs consisting of thin laminations of sands and shales, conventional induction logging tools greatly underestimate the resistivity of the reservoir: the currents induced in the formation by the logging tool flow preferentially through the conductive shale laminations creating a bias towards a higher formation conductivity. This could lead to an underestimation of hydrocarbon reserves.

One method for estimating hydrocarbon content of earth formations where shale laminations are present was developed by Poupon. See A. Poupon et al, "A Contribution to Electrical Log Interpretation in Shaly Sands", Transactions AIME, Vol. 201, pp. 138–145 (1959). Generally the Poupon relationship assumes that the shale layers affect the overall electrical conductivity of the earth formation being analyzed in proportion to the fractional volume of the shale layers within the particular earth formation being analyzed. The fractional volume is typically represented by $V_{sh}$ (shale "volume"). Poupon's model also assumes that the electrical conductivity measured by the well logging instrument will include proportional effects of the shale layers, leaving the remainder of the measured electrical conductivity as originating in the "clean" (non-shale bearing) reservoir rock layers as shown in the following expression:

$$\frac{1}{R_t} = (1 - V_{sh})\left(\frac{aR_w}{\phi^m}\right)^{-1} S_w^n + \frac{V_{sh}}{R_{sh}} \qquad (2)$$

where $R_t$ represents the electrical resistivity (inverse of conductivity) in the reservoir rock layers of the formation and $R_{sh}$ represents the resistivity in the shale layers.

The analysis by Poupon overlooks the effect of anisotropy in the resistivity of a reservoir including thinly laminated sands and shales. Use of improper evaluation models in many cases may result in an underestimation of reservoir producibility and hydrocarbon reserves by 40% or more as noted by van den Berg and Sandor. Analysis of well logging instrument measurements for determining the fluid content of possible hydrocarbon reservoirs includes calculating the fractional volume of pore space ("porosity") and calculating the fractional volumes within the pore spaces of both hydrocarbons and connate water. As noted above, Archie's relationship may be used.

In thinly laminated reservoirs where the wavelength of the interrogating electromagnetic wave is greater than the thickness of the individual layers, the reservoir exhibits an anisotropy in the resistivity. This anisotropy may be detected by using a logging tool that has, in addition to the usual transmitter coil and receiver coil aligned along with the axis of the borehole, a receiver or a transmitter coil aligned at an angle to the borehole axis. Such devices have been well described in the past for dip determination. See, for example, U.S. Pat. No. 3,510,757 to Huston and U.S. Pat. No. 5,115,198 to Gianzero, Co-pending U.S. patent application Ser. No. 09/474,049 (the '049 application) filed on Dec. 28, 1999 and the contents of which are fully incorporated herein by reference, disclosed a method of accounting for the distribution of shale in a reservoir including laminated shaly sands using vertical and horizontal conductivities derived from multi-component induction data. Data such as from a borehole resistivity imaging tool give measurements of the dip angle of the reservoir, and the resistivity and thickness of the layers on a fine scale. The measurements made by the borehole resistivity imaging tool are calibrated with the data from the induction logging tool that gives measurements having a lower resolution than the borehole resistivity imaging tool. A tensor petrophysical model determines the laminar shale volume and laminar sand conductivity from vertical and horizontal conductivities derived from the log data. The volume of dispersed shale and the total and effective porosities of the laminar sand fraction are determined using a Thomas-Stieber-Juhasz approach. Removal of laminar shale conductivity and porosity effects reduces the laminated shaly sand problem to a single dispersed shaly sand model to which the Waxman-Smits equation can be applied.

Co-pending U.S. patent application Ser. No. 09/539,053 (the '053 application) filed on Mar. 30, 2000, having the same assignee as the present application, and the contents of which are fully incorporated herein by reference, discloses a method of accounting for the distribution of shale and water in a reservoir including laminated shaly sands using vertical and horizontal conductivities derived from multi-component induction data. Along with an induction logging tool, data may also be acquired using a borehole resistivity imaging tool. The data from the borehole resistivity imaging tool give measurements of the dip angle of the reservoir, and the resistivity and thickness of the layers on a fine scale. The measurements made by the borehole resistivity imaging tool are calibrated with the data from the induction logging tool that gives measurements having a lower resolution than the borehole resistivity imaging tool. The measurements made by the borehole resistivity imaging tool can be used to give an estimate of $V_{sh\text{-}LAM}$, the volume fraction of laminar shale. A tensor petrophysical model determines the laminar shale volume and laminar sand conductivity from vertical and horizontal conductivities derived from the log data. The volume of dispersed shale, the total and effective porosities of the laminar sand fraction as well as the effects of clay-bound water in the formation are determined.

The method of the '053 application is not readily applicable to reservoirs in which the sands may be intrinsically anisotropic without making additional assumptions about the sand properties. Sands in turbidite deposits commonly comprise thin laminae having different grains size and/or sorting: the individual laminae may be isotropic but on a macroscopic scale relevant to logging applications, the laminations exhibit transverse isotropy. In addition, a reservoir including turbiditic sands exhibits an anisotropic permeability. Being able to determine this anisotropic permeability is important from the standpoint of reservoir development. This is an issue not addressed in the '053 application and of considerable importance in development of hydrocarbon reservoirs.

SUMMARY OF THE INVENTION

In one aspect of the invention, a method of petrophysical evaluation of a formation is disclosed wherein horizontal and vertical resistivities of the formation are inverted using a tensor petrophysical model to give a first estimate of fractional volume of laminated shale in the formation. This first estimate of fractional volume of laminated shale is comparted to a second estimate obtained from measurements of density and/or neutron porosity of the formation using a volumetric model. If the second estimate of fractional shale volume is greater than the first estimate of fractional shale volume, the horizontal and vertical resistivities are inverted using a tensor petrophysical model including the second estimate of fractional shale volume and obtaining a vertical and horizontal resistivity of an anisotropic sand component of the formation. This vertical and horizontal resistivity of the anisotropic sand component is used in conjunction with at least one additional measurement selected from the group consisting of: of (i) NMR measurements of the formation, and, (ii) a bulk permeability of the sand component to obtain properties a coarse and a fine grain portion of the sand component. The obtained properties of the coarse and fine grain portions of the sand include water saturations, and resistivities.

The properties of the coarse and fine grain portions of the sand are derived using an iterative solution process wherein a out of a family of possible distributions of said properties, a selection is made that matches the NMR measurement or the bulk permeability measurement. Relationships such as the Timur Coates equation may be used for the purpose. The bulk permeability measurement may be obtained from a formation testing instrument, a pressure build up test, a pressure drawdown test or from an NMR diffusion measurement.

Measurements of the horizontal and vertical resistivity may be obtained using a transverse induction logging tool, or from a conventional induction logging tool and a focused current resistivity tool.

DETAILED DESCRIPTION OF THE INVENTION

Figure 1:
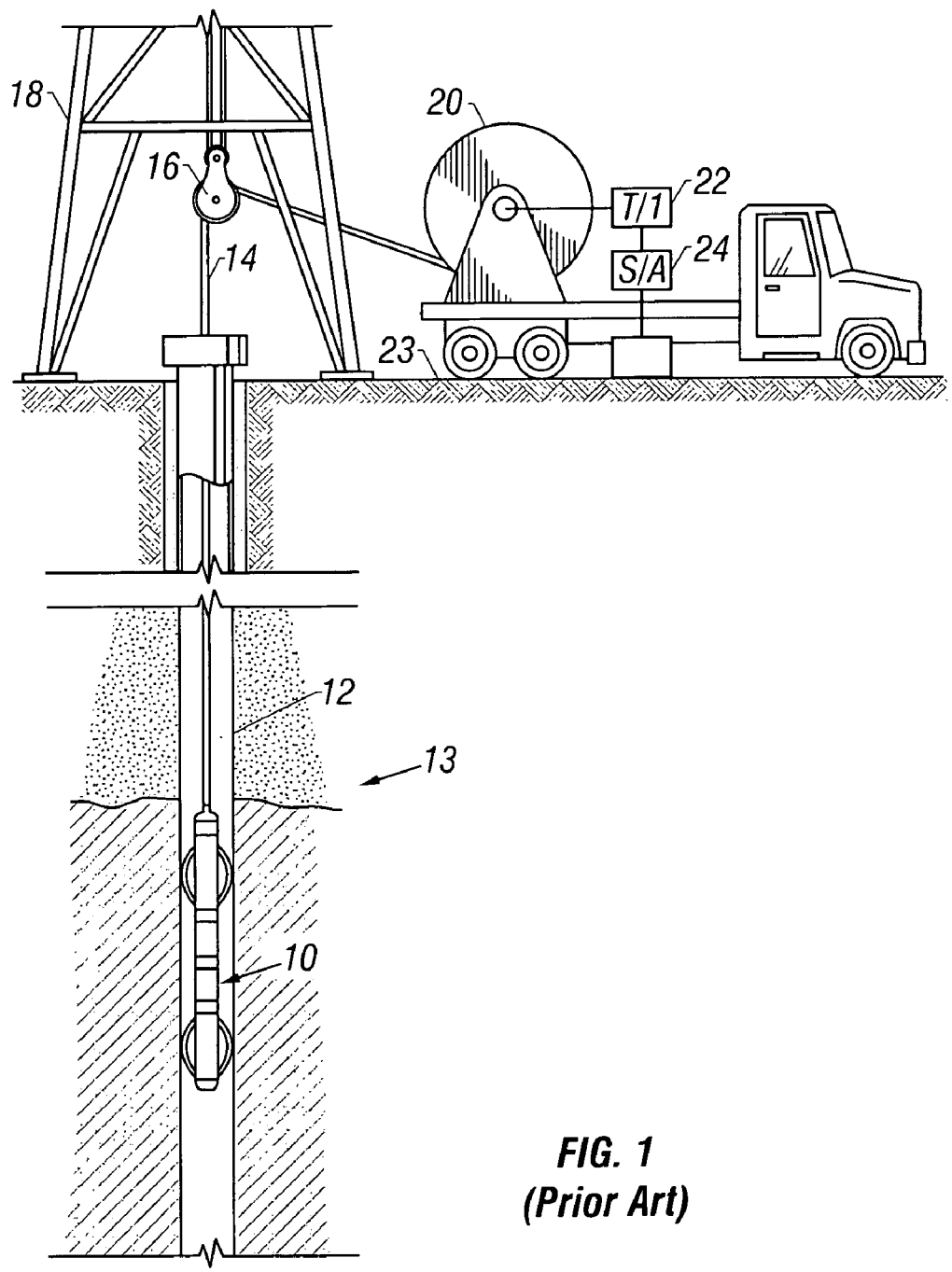
FIG. 1 (PRIOR ART) shows a resistivity imaging tool suspended in a borehole.
Figures 2A, 2B:
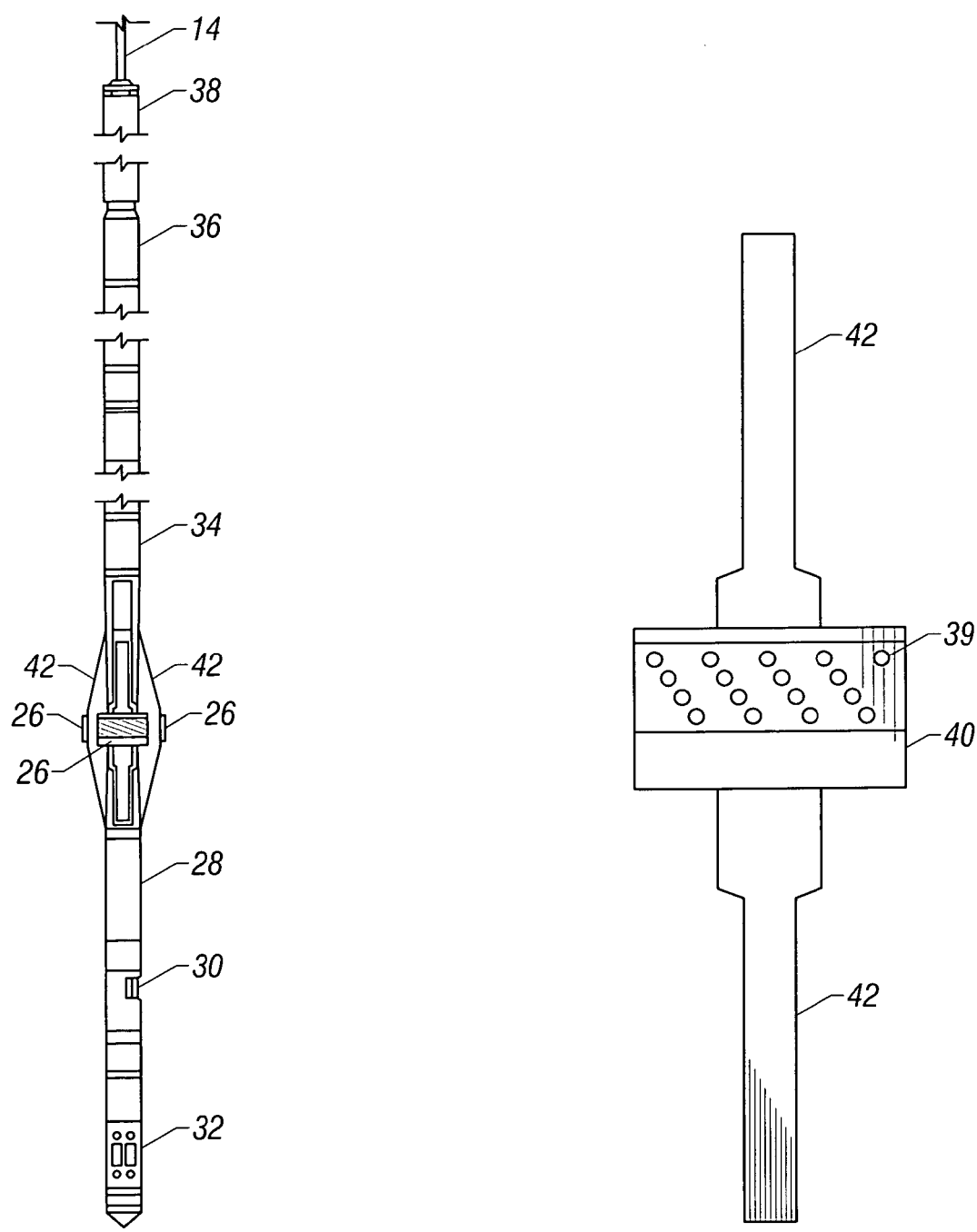
FIG. 2A (PRIOR ART) is a mechanical schematic view of the imaging tool of FIG. 1.
FIG. 2B (PRIOR ART) is a detail view of an electrode pad for the tool of FIGS. 1, 2A.
Figure 3:
FIG. 3 (PRIOR ART) is a pictorial view of a composite imaging log obtained by merging the resistivity image data shown in acoustic image data.
Figure 4A:
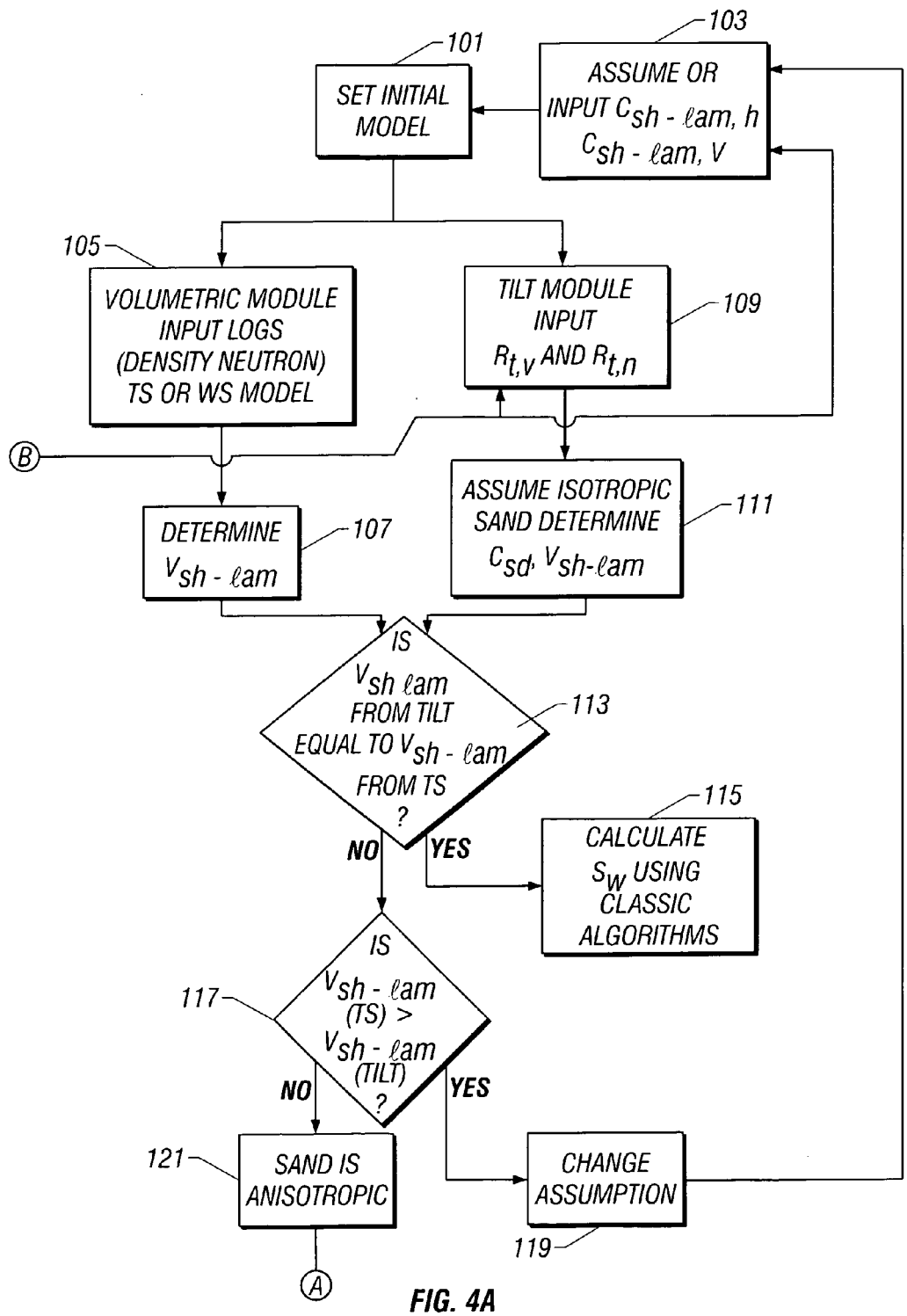
FIGS. 4A and 4B illustrate the principal steps of the process of one embodiment of the invention.
Figure 4B:
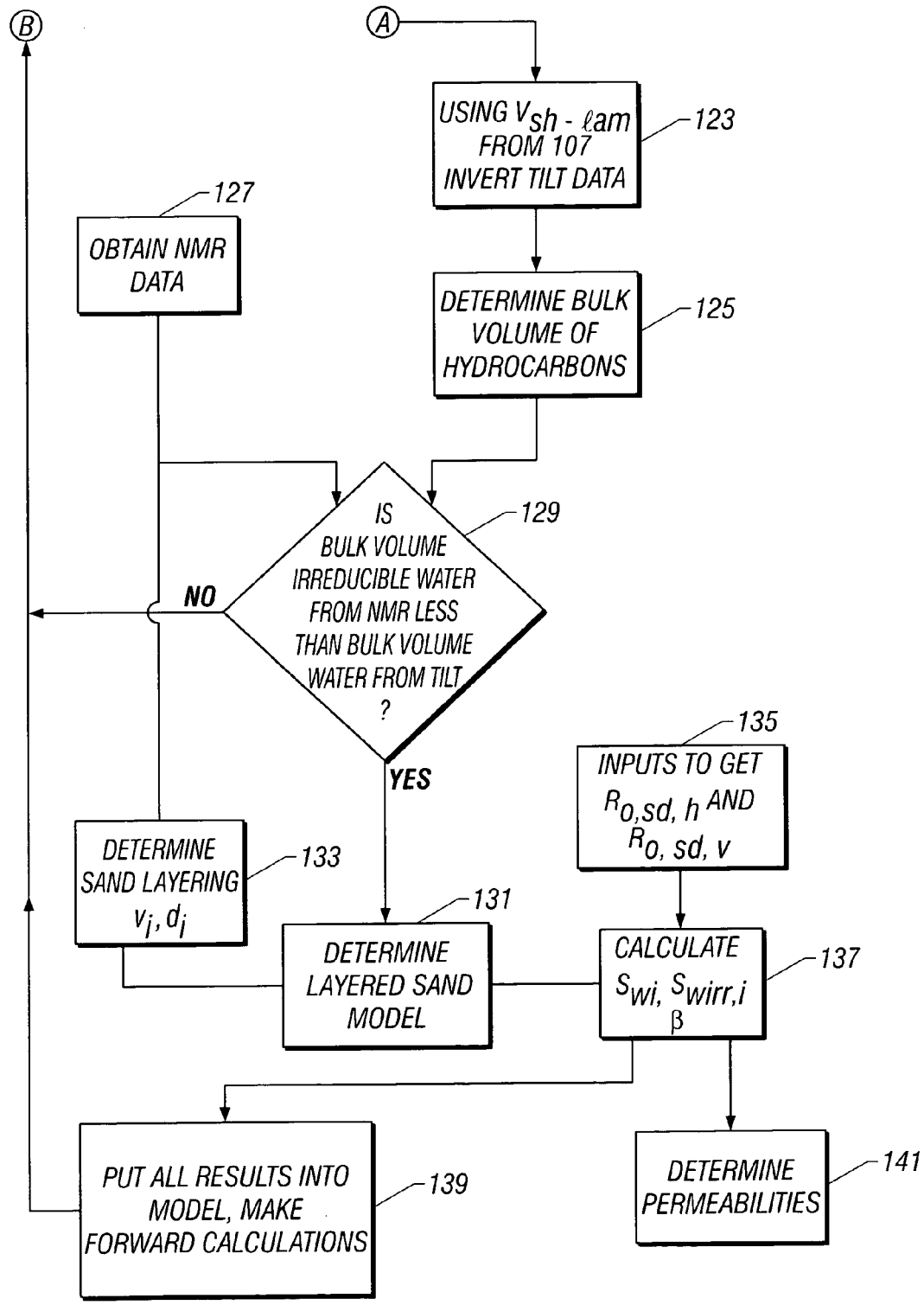

The present invention is best understood by referring to FIGS. 1–7. FIG. 4 is a schematic flowchart of the major steps of the process used in the present invention. FIG. 1 shows a composite imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives digital data back which may be recorded on an archival storage medium of any desired type for concurrent or later processing. A data processor 24, such as a suitable computer, may be provided for performing data analysis in the field in real time or the recorded data may be sent to a processing center or both for post processing of the data.

FIG. 2 is a schematic external view of the unified borehole sidewall imager system. This may be used to provide the data that may be used in an optional embodiment of the invention. The tool 10 comprising the imager system includes four important components: 1) resistivity arrays 26; 2) electronics modules 28 and 38; 3) a mud cell 30; and 4) a circumferential acoustic televiewer 32. All of the components are mounted on a mandrel 34 in a conventional well-known manner. The outer diameter of the assembly is about 5.4 inches and about five feet long. An orientation module 36 including a magnetometer and an inertial guidance system is mounted above the imaging assemblies 26 and 32. The upper portion 38 of the tool 10 contains a telemetry module for sampling, digitizing and transmission of the data samples from the various components uphole to surface electronics 22 in a conventional manner. Preferably the acoustic data are digitized although in an alternate arrangement, the data may be retained in analog form for transmission to the surface where it is later digitized by surface electronics 22.

Also shown in FIG. 2 are three resistivity arrays 26 (a fourth array is hidden in this view). Referring to FIGS. 2 and 2A, each array includes 32 electrodes or buttons identified as 39 that are mounted on a pad such as 40 in four rows of eight electrodes each. Because of design considerations, the respective rows preferably are staggered as shown, to improve the spatial resolution. For reasons of clarity, less than eight buttons are shown in FIG. 2A. For a 5.375" diameter assembly, each pad can be no more than about 4.0 inches wide. The pads are secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Using time-division multiplexing, the voltage drop and current flow is measured between a common electrode on the tool and the respective electrodes on each array to furnish a measure of the resistivity of the sidewall (or its inverse, conductivity) as a function of azimuth.

The acoustic imager that forms the circumferential borehole imaging system 32 provides 360° sampling of the sidewall acoustic reflectivity data from which a continuous acoustic imaging log or sonogram can be constructed to provide a display of the imaged data.

The borehole resistivity imaging tool arrays necessarily allow sampling only across preselected angular segments of the borehole sidewall. From those data, a resistivity imaging log, consisting of data strips, one strip per array, separated by gaps, can be constructed and displayed. The angular width of each data-scan strip is equal to $2 \sin^{-1} \{S/(2R)\}$, where S is the array width and R is the borehole radius. The common data from the two imagers are merged together in a data processing operation to provide a substantially seamless display as shown in FIG. 3. The merging incorporates equalizing the dynamic range of the resistivity measurements with respect to the acoustic measurements. That balance is essential in order that the continuity of a displayed textural feature is not distorted when scanning across a resistivity segment of the display, between adjacent acoustic segments.

The display in FIG. 3 incorporates measurements from directional sensors to align the resistivity measurements with geographical coordinates (North, East, South, West), with the resistivity image being "unfolded" to provide a flat image of the cylindrical surface of the borehole. Those versed in the art would recognize that when a plane intersects a circular cylinder at an angle, the unrolled image of the plane would appears as a sinusoid. The display in FIG. 3 shows many such sinusoids, some corresponding to bedding planes and others corresponding to fractures. The dip angle and the dip direction corresponding to the various sinusoids are determined in the present invention using known methods. When these data are combined with measurements from other logs, such as a gamma ray or a neutron log, discrete layers of different lithologies may be identified. In particular, over a gross interval of the order of several meters or so, the fractional volume of laminated shale present in a laminated reservoir may be determined.

With flat dips, the sinusoids have essentially zero amplitude. In one aspect of the present invention, the resistivity measurements are averaged circumferentially and vertically within each identified layer to give an average resistivity measurement for each layer identified above. Once this is done, the subsurface may be characterized by a number of plane layers, each of which has a constant resistivity. With the resolution of the button-electrode tool, these layers may range in thickness from a few millimeters to a few centimeters.

Those versed in the art would recognize that when the bed boundaries are dipping, then the currents into the electrodes, particularly those in the dip direction, on the pads may not be confined to a single layer and hence not represent the resistivity of the layer at the borehole. In one aspect of the invention, the averaging described above is limited to electrodes in the strike direction: these measurements would be more likely representative of the true formation resistivity at the depth of measurement.

The resistivity measurements obtained by the averaging process correspond to layers that are beyond the resolution of electromagnetic induction logging tools or propagation resistivity tools. Accordingly, the resistivity measurements obtained at this point are averaged to give resistivities on a scale that would be measurable by an induction logging tool.

As would be known to those versed in the art, a finely laminated sequence of layers having different resistivities exhibits a transverse isotropy on a larger scale where the wavelength of the electromagnetic wave is much greater than the layer thickness. This condition is easily satisfied even for propagation resistivity tools that, e.g., operate at a frequency of 2 MHz (with a wavelength λ≈6 meters); for induction logging tools that have frequencies of the order of 50 kHz to 200 kHz, the wavelengths are even longer. For such interrogating frequencies, the layered medium is characterized by a horizontal resistivity $R_h^*$ and a vertical resistivity $R_v^*$ given by:

$$R_v^* = \frac{1}{W} \sum_{W_i} R_i \Delta h \tag{3}$$

and $$(R_h^*)^{-1} = \frac{1}{W} \sum_{w_i} \frac{\Delta h}{R_i} \tag{4}$$

where $W_i$ is a window used to average the resistivities, $\Delta h$ is the depth sampling interval of the electrodes, and $R_i$ is the measured resistivity for a given depth.

In this invention, the terms "horizontal" and "vertical" are to be understood in terms of reference to the bedding planes and the anisotropy axes of the subsurface formations, i.e., "horizontal" refers to parallel to the bedding plane, and "vertical" refers to vertical to the bedding plane. Where the beds of the formation are dipping, the anisotropy axis is taken to be the normal to the bedding plane. When the borehole is inclined to the bedding plane, data from the orientation module 36 in FIG. 1, may be used to correct the resistivity measurements made by the resistivity imaging tool to give measurements parallel to and perpendicular to the bedding planes.

Those versed in the art would recognize that the resistivity measurements made by the electrode-pad system described above may be in error and, in particular, may need to have a scaling factor applied to the data. When this data is acquired, it may be calibrated by relating the values given by equations (3) and (4) to data from an induction logging tool or a propagation resistivity tool.

Referring now to FIG. 4, one optional embodiment of the invention starts with data acquired by a borehole resistivity imaging tool such as is described in U.S. Pat. No. 5,502,686 issued to Dory et al., and the contents of which are fully incorporated here by reference. It should be noted that the Dory patent is an example of a device that can be used for obtaining measurements borehole resistivity measurements: any other suitable device could also be used. The process of the invention starts with an initial model 101 for the structure of the reservoir. This initial model comprises a laminated shale fraction and a sand fraction. This initial model may be derived from the resistivity imaging tool described above. A horizontal and vertical conductivity $C_{sh-lam,h}$ and $C_{sh-lam,v}$) of the shale fraction is assumed or is measured 103; if measurements are to be made within a borehole, this may be done by using a Transverse Induction Logging Tool (TILT) on a thick section of shale in proximity to the reservoir. The resistivity of the "bulk" shale may also be obtained from core measurements.

An induction or wave propagation tool is used to make measurements of the vertical and horizontal resistivity of the earth formations. For example, U.S. Pat. No. 5,781,436 to Forgang et al, the contents of which are fully incorporated here by reference, discloses a method an apparatus for making measurements of horizontal and vertical resistivities of a transversely isotropic formation.

The method disclosed by Forgang et al comprises selectively passing an alternating current through transmitter coils inserted into the wellbore. Each of the transmitter coils has a magnetic moment direction different from the magnetic moment direction of the other ones of the transmitter coils. The alternating current includes a first and a second frequency. The amplitude at the first frequency has a predetermined relationship to the amplitude at the second frequency. The relationship corresponds to the first and the second frequencies. The method includes selectively receiving voltages induced in a receiver coil having a sensitive direction substantially parallel to the axis of the corresponding transmitter coil through which the alternating current is passed. A difference in magnitudes between a component of the received voltage at the first frequency and a component of the voltage at the second frequency is measured, and conductivity is calculated from the difference in magnitudes of the components of the received voltage at the two frequencies. The Forgang patent is cited only by way of example of an induction device for obtaining horizontal and vertical resistivities of a formation and there are other teachings on obtaining these properties of subterranean formation.

An example of a propagation resistivity tool for making measurements of horizontal and vertical resistivities is described by Rosthal (U.S. Pat. No. 5,329,448) discloses a method for determining the horizontal and vertical conductivities from a propagation logging device. The method assumes that θ, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

As described in the '053 and '967 applications, measurements $R_{t,h}$ and $R_{t,v}$ made by TILT or other suitable device are inverted 111 to give an estimate of the laminar shale volume and the sand conductivity, assuming that the sand component is isotropic. In terms of resistivity, $$R_{sd} = \frac{1}{2} \cdot \{(R_{sd}^{iso} + R_{sh-l,m}) + (R_{sd}^{iso} - R_{sh-l,v}) \cdot \sqrt{(1 + \Delta R)}\} \tag{5}$$

where $$R_{sd}^{iso} = R_{t,h} \cdot \frac{R_{t,v} - R_{sh-l,v}}{R_{t,h} - R_{sh-l,h}} \quad \Delta R = 4 \cdot R_{sd}^{iso} \cdot \frac{R_{sh,v} - R_{sh-l,h}}{(R_{sd}^{iso} - R_{sh-l,v})^2} \tag{6}$$

$R_{sd}^{iso}$ is the 'isotropic' sand resistivity. If the shale is isotropic, ($R_{sh,h}=R_{sh,v}$), then this resistivity is identical to the sand resisitivity. ΔR is the correction for anisotropic shale. ΔR becomes zero for an isotropic shale ($R_{sh,h}=R_{sh,v}$).

The inversion also gives $$V_{sh-l} = \frac{R_{sd} - R_{t,v}}{R_{sd} - R_{sh-l,v}} = \frac{R_{sd}^{-1} - R_{t,h}^{-1}}{R_{sd}^{-1} - R_{sh-l,h}^{-1}} \quad (7)$$

An independent estimate of the laminar shale volume $V_{sh-l,TS}$ is obtained 107 from volumetric measurements using density or neutron logs 105 and using a method such as the well-known Waxman-Smits or Thomas-Stieber methods. Acoustic imaging logs may also be used to get the volume fraction of laminar shale. Obtaining this independent estimate of laminar shale volume $V_{sh-l,TS}$ would be known to those versed in the art and is not discussed further here.

Next, a check is made 113 to see if the $V_{sh-l}$ from the TILT inversion agrees with the $V_{sh-l,TS}$ from neutron or density logs. If the two estimates of laminar shale volume are consistent 115, then the assumption of an isotropic sand at 111 is valid and classical methods based on Archie or Waxman-Smits are used to determine water saturation of the sands. Alternatively, the Dual-Water method disclosed in the '053 application are used to determine the water saturation in the sand.

If the answer at 113 is "No", then a check is made to see if $V_{Sh-l,TS}$ is greater than $V_{sh-l}$, 117. If the answer is "Yes", then this is an indication to change 119 the assumptions made at 103. After changing the assumptions about the horizontal and vertical shale conductivities, the process goes back to 101. If the vertical shale conductivity is obtained from an actual measurement, then the assumed shale anisotropy factor is in error and a new value is chosen. Alternatively, the input parameters for the Thomas-Stieber calculations must be modified.

If the answer at 117 is "No", then this is an indication that the sands component is anisotropic 121. In this case, the TILT resistivity data are inverted 123 using the value of $V_{sh-l,TS}$ obtained at 107, e.g., using Thomas-Stieber and the method of the '049 application or the method of the '053 application, to give a water saturation $S_w$.

As a check on the determination of water saturation from the inversion of TILT data, NMR data are obtained 127 and from the NMR data, a determination of the bulk volume of irreducible water in the formation is made. Methods for determination of irreducible water saturation $S_{w,irr}$ from NMR data are disclosed in U.S. Pat. Nos. 5,412,320 and 5,557,200, the contents of which are fully incorporated herein by reference and not discussed further here. The bulk irreducible water content is given by $S_{w,irr}\phi H$, where $\phi$ is the porosity and H is the thickness, while the bulk water content from the TILT data is given by $S_w \phi H$. A check is made 129 to see if the former quantity is less than the latter quantity. If the test at 129 is negative, then it is an indication that there is a problem in the TILT model and the process is restarted at 103. If the test at 129 is positive, then use is made of horizontal and vertical sand resistivities $R_{sd,h}$ and $R_{sd,v}$ in the TILT inversion 123 given by $$R_{sd,h} = (1 - V_{sh-l,TS})\left(\frac{1}{R_{t,h}} - \frac{V_{sh-l,TS}}{R_{sh-l,h}}\right) \quad (8)$$

-continued $$R_{sd,v} = \frac{R_{t,v} - V_{sh-l,TS} \cdot R_{sh-l,v}}{1 - V_{sh-l,TS}} \quad (9)$$

The sand anisotropy with resistivity values $R_{sd,h}$ and $R_{sd,v}$ is indicative of a laminated sand layer. These values of $R_{sd,h}$ and $R_{sd,v}$ are inverted to give a layered model 131 comprising isotropic sand layers and the laminated shale component determined above. In order to perform this inversion, an estimate of the number and thicknesses of the sand layers is required. This may be obtained from a resistivity imaging tool as discussed in the '053 and '967 applications or it may be obtained using NMR data 127. From the distribution of relaxation times $T_1$ and $T_2$ of NMR data, a distribution of volume fractions of individual sand components 133 may be obtained using known methods. Alternatively, core information or sedimentologic information about the reservoir may be used to give the volume fractions of the sand components.

For the particular case of two components, eqns. (8) and (9) may be inverted to give a unique solution for isotropic conductivities for two sand layers having the appropriate volume fractions. If the number of sand layers in the laminated sand component is more than two, then there is no unique model of isotropic sand layers having an observed vertical and horizontal resistivity on a macroscopic scale. For the case of more than two sand layers, additional information, such as some relationship between the individual sand resistivities, is necessary to obtain the laminated sand component of the reservoir. The result of this inversion 131 of a model of volume fractions ($V_{sh-lam}, V_{sd,1}, V_{sd,2} \ldots$) and resistivities ($R_{sh-lam,v}, R_{sh-lam,h}, R_{t,sd,1}, R_{t,sd,2} \ldots$). For convenience, the discussion hereafter is limited to two sand layers though it is to be understood that additional layering of the laminated sand component is possible.

Using assumed values for the water saturated sand in horizontal and vertical direction $R_{0,sd,h}$ and $R_{0,sd,v}$ the water saturation of the individual sand layer $S_{w,i}$ (i-th layer) are calculated separately 135 using the layer resistivity $R_{sd,i}$ obtained at 131. Depending on the saturation equation (Archie-equation, Waxman-Smits-equation) the following parameters are necessary as input: (i) Formation water resistivity, (ii) porosity or formation factor of the layer, (iii) saturation exponent of the layer, and, (iv) Waxman-Smits-parameters in case of dispersed shale in the sand layer.

Figure 5A:
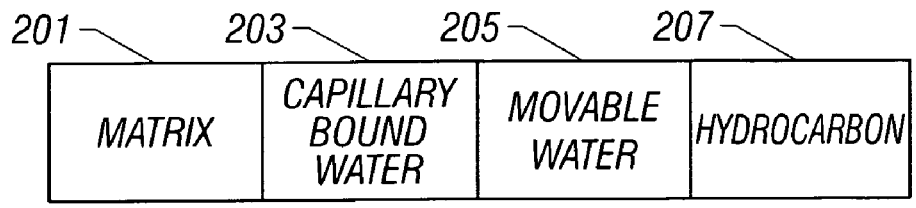
FIG. 5A is a schematic illustration of the distribution of water and hydrocarbons in a porous reservoir.

A direct method for saturation calculation for a bimodal sand is given in Schoen et al. As shown therein, a simple model is presented to describe the influence of changing water content upon the electrical properties for a thinly laminated bimodal Archie-type sand. The sand comprises a coarse-grained component and a fine-grained component. The coarse sand fraction is characterized by low irreducible water saturation and the fine fraction, by high irreducible water saturation. As shown in FIG. 5a, a single sand layer may be depicted by four constituents: the matrix 201, capillary bound water 203, movable water 205 and hydrocarbon 207. The volume fraction of 203, 205 and 207 is the porosity of the sand. The change of water content only takes place in the pore space occupied by the mobile fluid pore space (the combination of 205 and 207). In this example, the pore space is occupied by immobile water (capillary bound water) and movable fluids (movable water, oil, and gas). The complete pore space therefore is not available for the variation of the water saturation, but only the mobile water fraction, $1-S_{w,irr}$. Detailed information about the saturation behavior in the individual layers could be derived from capillary pressure curves. For the simplified forward calculation this variation is expressed by a parameter defined as β and the total water saturation, assuming no clay-bound water, component can be written:

$$S_w = S_{w,irr} + \beta \cdot (1 - S_{w,irr}) = \beta + S_{w,irr} \cdot (1 - \beta) \quad (10)$$

The parameter β describes how the "free water pore space" is occupied; for β=0, $S_w = S_{w,irr}$ while for β=1, $S_w = 1$.

Figure 5B:
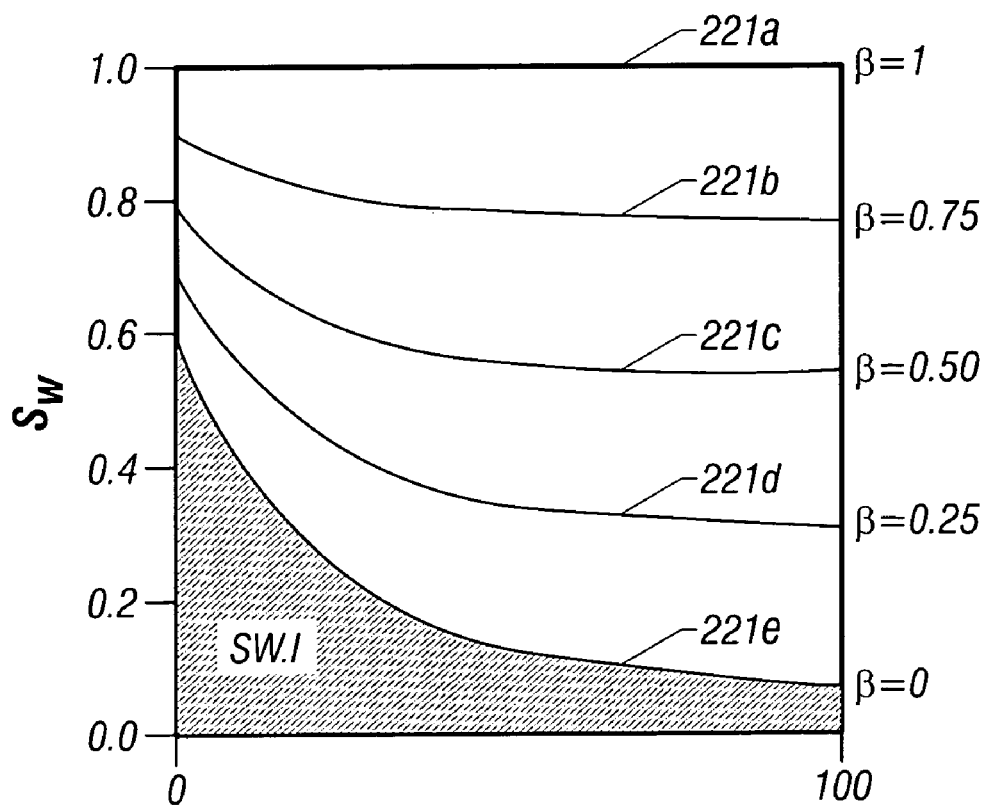
FIG. 5B shows the relationship between water saturation and the volume of coarse grain sand in a porous rock.

For determining a variation of the total water content, one embodiment of the present invention assumes that all sand fractions are characterized by the same value of for β but different $S_{w,irr}$. Thus, the "free water pore space" is occupied in the same ratio for all sand fractions as it is described schematically in FIG. 5b. Shown in FIG. 5b is a plot of the water saturation (ordinate) as a function of the percentage of coarse grained component of the sand (abscissa). Five different values of β are shown in the curves 221a, 221b ... 221e, the last of which corresponds to β=0 and having a value of $S_w = S_{w,irr}$ For a two-component sand interval (e.g., coarse, subscript c and fine, subscript f) we have two different values for $S_{w,irr}$ ($S_{w,irr,c}$ and $S_{w,irr,f}$) and the vertical and horizontal resistivities are $$R_{t,v} = R_w \cdot \begin{bmatrix} V_c \cdot F_{c,v} \cdot [\beta + S_{w,irr,c} \cdot (1-\beta)]^n + \\ V_f \cdot F_{f,v} \cdot [\beta + S_{w,irr,f} \cdot (1-\beta)]^n \end{bmatrix} \quad (11)$$

and $$R_{t,h} = R_w \cdot \begin{bmatrix} \dfrac{V_c}{F_{c,h} \cdot [\beta + S_{w,irr,c} \cdot (1-\beta)]^n} + \\ \dfrac{V_f}{F_{f,h} \cdot [\beta + S_{w,irr,f} \cdot (1-\beta)]^n} \end{bmatrix} \quad (12)$$

where $V_c$, $V_f$ are the volume fractions of the coarse and fine sand, $F_{c,v}$, $F_{c,h}$, $F_{f,v}$, $F_{f,h}$ are the formation factors for coarse and fine sand related to vertical and horizontal current direction.

The mean saturation of the interval is $$S_w \dfrac{V_c \cdot \phi_c \cdot [\beta + S_{w,irr,c} \cdot (1-\beta)] + V_f \cdot \phi_f \cdot [\beta + S_{w,irr,f} \cdot (1-\beta)]}{V_c \cdot \phi_c + V_f \cdot \phi_f} \quad (13)$$

where $\phi_c$, $\phi_f$ are the porosities of the coarse and fine sand fraction. In a preferred embodiment of the invention, it is assumed that the two sand layers have the same intrinsic microscopic anisotropy of the formation factor. In most cases, this microscopic anisotropy of the individual sand layers can be neglected when compared with the macroscopic anisotropy effect. Then the resistivity horizontal and vertical resistivity indices are $$RI_h = \{V_c \cdot [\beta + S_{w,irr,c} \cdot (1-\beta)] + V_f \cdot [\beta + S_{w,irr,f} \cdot (1-\beta)]^n\}^{-1} \quad (14)$$

and $$RI_v = \dfrac{V_c}{[\beta + S_{w,irr,c} \cdot (1-\beta)]^n} + \quad (15)$$

-continued $$\dfrac{V_f}{[\beta + S_{w,irr,f} \cdot (1-\beta)]^n}$$

Figure 6A:
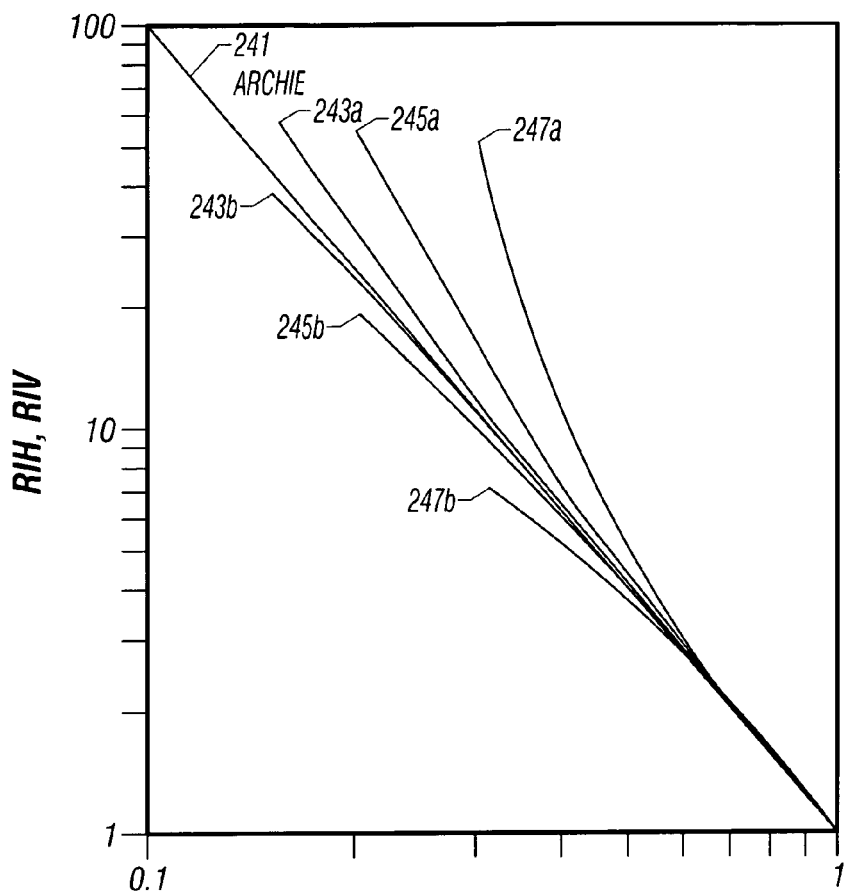
FIG. 6A is a plot of resistivity index as a function of water saturation for a bimodal sand reservoir.

The different saturations in the two sand fractions is electrically described now by the two resistivity indices. With Eq. (13) the resistivity versus water saturation relationships can be calculated. FIG. 6a shows a logarithmic plot of the calculated resistivity index (ordinate) versus water saturation (abscissa). For each individual sand layer, a saturation exponent index of n=equal to 2 was assumed. For the Archie relationship, the curve is a straight line 241 with a slope of 2.

All the curves in FIG. 6a correspond to an $S_{w,irr,c}=0.1$. The curves 243a, 243b are the vertical and horizontal resistivity indices for a value of $S_{w,irr,f}=0.2$; the curves 245a, 245b are the vertical and horizontal resistivity indices for a value of $S_{w,irr,f}=0.3$; while the curves 247a, 247b are the vertical and horizontal resistivity indices for a value of $S_{w,irr,f}=0.5$.

The anisotropy effect associated with the different partial water saturations however results in the following:

(1) The saturation exponent relationship is a curve not a straight line and the saturation index exponent, n, of for the "composite" is dependent on water saturation.
(2) The vertical resistivity indices are much higher, and the horizontal resistivity index indices are smaller when compared to values for an Archie sand with n=2.
(3) The deviation of the resistivity index saturation exponent from n=2 increases with decreasing water saturation (increasing hydrocarbon saturation).
(4) For $S_w$ equal to 1, both curves converge to the Archie n=2 curve.
(5) All the saturation exponent variations are controlled by the contrast in irreducible water saturation and volume fraction of the sands.

Figure 6B:
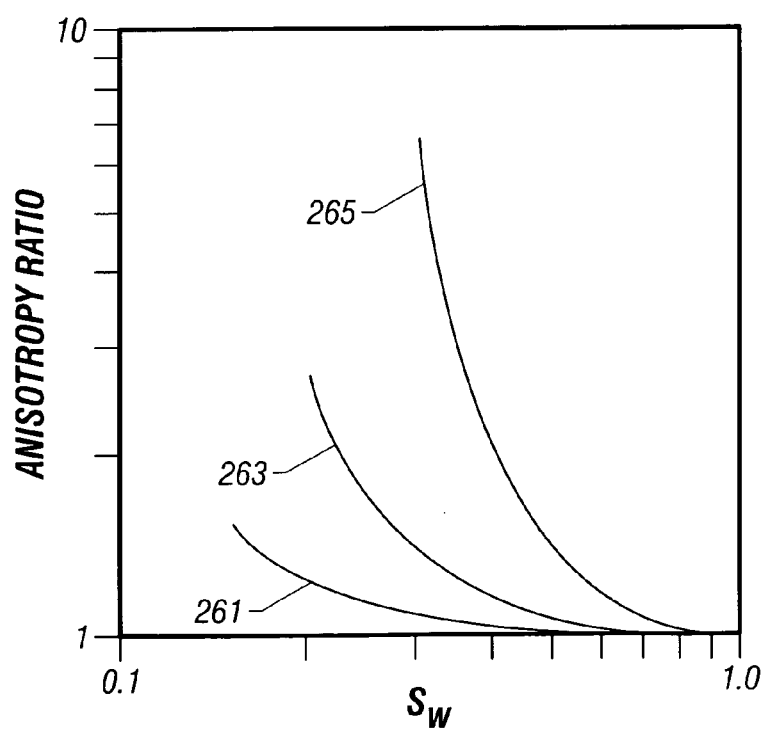
FIG. 6B shows the effect of water saturation on the resistivity anisotropy of a bimodal sand.

The ratios of resistivity anisotropy versus water saturation for the case shown in FIG. 6a are shown in FIG. 6b for the same cases shown in FIG. 6a. As in FIG. 6a, $S_{w,irr,c}=0.1$. The curves 261, 263 and 265 correspond to values of $S_{w,irr,f}$ equal to 0.2, 0.3 and 0.5 respectively. The abscissa is the mean water saturation while the ordinate is the resistivity anisotropy ratio. FIG. 6b illustrates the remarkable influence of low water saturation (high hydrocarbon saturation) on anisotropy. The maximum possible anisotropy ratio is determined by the maximum possible contrast of the two irreducible water saturations. In this example, maximum anisotropy strongly trends to the higher "mean" water saturation as a result of the high value $S_{w,irr,f}$.

Having reviewed the effect of water saturation on the anisotropy of a laminated sand, we now address the problem of inverting measured values of horizontal and vertical resistivities for a laminated sand to obtain water saturations. The saturation determination problem for laminated, bimodal sands can be described as follows:

(1) For the laminated macroscopic anisotropic sand, no constant saturation exponent n can be defined.
(2) A formalistic application of Archie's equation with a constant saturation exponent results in different saturation values for horizontal and vertical measured resistivities, and a physically incorrect result.

In a preferred embodiment of the invention, a hydrocarbon-bearing bimodal sand, is modeled as comprising an alternating square step profile of a coarse (subscript c) and a fine fraction (subscript f). Other embodiments of the invention use other profiles, such as a triangular gradation of grain size between two limits. The calculations for such profiles would be readily obtainable for those versed in the art based upon discussions given here and in *Schoen, Mollison & Georgi* (1999) and are not discussed further.

The pore space of both sand layers has different water saturation. The water saturation of the fine sand $S_{w,f}$ is higher than the water saturation of the coarse sand $S_{w,c}$. In particular, different grain sizes result in proportionately different pore sizes and can be directly related to irreducible water saturation and capillary pressure. For both sands we assume that Archie's law is valid and no shale is present. The mean water saturation of the interval $S_w$ is:

$$S_w = V_c \cdot S_{w,c} + V_f \cdot S_{w,f} \quad (16)$$

The horizontal and vertical resistivities of the composite sediment are determined as follows $$R_{t,h} = R_w \cdot \left[ \frac{V_c}{F_{h,c}} \cdot S_{w,c}^n + \frac{V_f}{F_{h,f}} \cdot S_{w,f}^n \right]^{-1} \quad (17)$$

$$R_{t,v} = R_w \cdot \left[ \frac{V_c \cdot F_{v,c}}{S_{w,c}^n} + \frac{V_f \cdot F_{v,f}}{S_{w,f}^n} \right] \quad (18)$$

where $F_{c,v}$, $F_{c,h}$, $F_{f,v}$, $F_{f,h}$ are the formation factors for the coarse and fine sands for the vertical and horizontal current directions.

The following equations focus on the influence of the water saturation upon the resistivity and anisotropy. For well-sorted sands the porosity is independent of grain size; thus, a reasonable assumption is that the fine and coarse sand fraction porosities are similar. Further, it is attractive to assume that the formation factor is a simple single valued scalar. Therefore, in a first approximation, in the preferred embodiment of the invention, we assume that within the interval the formation factor is constant within the interval of interest. This assumption results in a simplification of the equations.

For the bimodal sand we derive three equations: horizontal resistivity index (Eq. 19), vertical resistivity index (Eq. 20), and volumetric closure (Eq. 21):

$$RI_h = \frac{R_{t,h}}{R_{0,h}} = [V_c \cdot S_{w,c}^n + V_f \cdot S_{w,f}^n]^{-1} \quad (19)$$

$$RI_v = \frac{R_{t,v}}{R_{0,v}} = \frac{V_c}{S_{w,c}^n} + \frac{V_f}{S_{w,f}^n} \quad (20)$$

$$V_c + V_f = 1 \quad (21)$$

The inversion process results in two water saturation values, $S_{w,c}$ and $S_{w,f}$. This calculation requires the volume fraction of one component (e.g., coarse component $V_c$ or the fine component $V_f$ as $V_f + V_c = 1$). Possible sources of the sand grain-size distribution are whole sidewall core data or the addition of NMR log data.

Because n is not constant and Archie's law is not valid for the composite resistivity index, the following calculation is done to find one consistent solution for the water saturation values of the two layers. We start with eqs. (19) and (20). From our a priori information of the coarse component, $S_{w,c}^n$ from eq. (19) is inserted into eq. (20), resulting in the water saturation of the fine sand fraction:

$$S_{w,f} = \left\{ \frac{1}{2} \left[ \frac{RI_h^{-1} + RI_v^{-1} \cdot (1 - 2V_c)}{1 - V_c} \right] \pm \sqrt{\frac{1}{4} \left[ \frac{RI_h^{-1} + RI_v^{-1} \cdot (1 - 2V_c)}{1 - V_c} \right]^2 - [RI_v RI_h]^{-1}} \right\} \quad (22)$$

Note that only the positive root is physically realistic.

The water saturation of the coarse fraction can then be determined as $$S_{w,c} = \left\{ V_c \cdot \left[ RI_v - \frac{1 - V_c}{S_{w,f}^n} \right]^{-1} \right\}^{\frac{1}{n}} = (V_c)^{\frac{1}{n}} \cdot \left[ RI_v - \frac{1 - V_c}{S_{w,f}^n} \right]^{-\frac{1}{n}}. \quad (23)$$

Thus, both saturation values are obtained and the mean saturation is obtained from eq. (16).

Returning now to FIG. 4B, in an optional embodiment of the invention, the results derived above are used for forward modeling of the properties of the reservoir rock 139 and a consistency check may be made going back to 103. Still referring to FIG. 4B, an anisotropic permeability calculation is made 141 for the reservoir with the properties as derived above. This is accomplished as described immediately below.

The starting point for the permeability determination is the Coates-Timur equation $$k = \left( \frac{\phi}{C} \right)^a \cdot \left( \frac{\phi - BVI}{BVI} \right)^b. \quad (24)$$

An alternate form of the equation is given by Kenyon as $k = C\phi^a T^b$ and may be used.

For the bimodal sand distribution derived above, for the two individual layers, the microscopic permeabilities are $$k_f = \left( \frac{\phi_f}{C} \right)^a \left( \frac{\phi_f - BVI_f}{BVI_f} \right)^b \quad (25)$$

and $$k_c = \left( \frac{\phi_c}{C} \right)^a \cdot \left( \frac{\phi_c - BVI_c}{BVI_c} \right)^b \quad (26)$$

The macroscopic permeabilities in the horizontal and vertical directions are $$k_h = V_c \cdot k_c + V_f \cdot k_f \quad (27)$$

and $$k_v = \{ V_c \cdot k_c^{-1} + V_f \cdot k_f^{-1} \}^{-1} \quad (28).$$

Solution of eqs. (19)–(28) requires knowledge of the volume fractions of the coarse—and fine-grained components of the sand. This may be obtained from core analysis or from distribution of NMR relaxation times.

In an alternate embodiment of the invention, eqs. (19)–(28) are solved for a suite of values of $V_c$ and $V_f$ to give a family of solutions. Each of these has associated values of $k_h$ and $k_v$. From these derived horizontal and vertical permeabilities, a global permeability is determined that averages over the individual layers and directions. One such global measure of permeability is the spherical permeability given by $$k_{sph} = (k_h^2 k_v)^{\frac{1}{3}}. \tag{29}$$

In a preferred embodiment of the invention, it is assumed that the permeability derived from NMR measurements is this spherical permeability. Alternatively, a permeability may be obtained using the formation testing instrument marketed by Baker Hughes under the mark RCI™. Bulk permeability may also be obtained from reservoir pressure buildup tests of pressure drawdown tests.

Having a measurement of the bulk permeability gives a unique solution to the inversion problem. In one embodiment of the invention, this solution is obtained using a nonlinear iterative algorithm. Such an algorithm would be known to those versed in the art and is not discussed further. Alternatively, the unique solution may be obtained by a table look up in a processor or by an equivalent graphical solution given in the example below.

In order to test the method a data set was created by forward calculation. With the resulting data then the iterative inversion algorithm was started.

Data for forward calculation:
$R_w$=0.1 Ohm m m=n=2
$V_c$=0.4 $V_f$=0.6 $\Phi_c$=0.34 $\Phi_f$=0.25 $BVI_c$=0.05 $BVI_f$=0.10
using Coates equation the microscopic permeabilities are:
$k_f$=88 md $k_c$=4495 md Result of forward calculation (macroscopic model data):

| | | |
|---|---|---|
| $R_v$ = 22.0 Ohm m | $R_h$ = 14.3 Ohm m | |
| $\Phi$ = 0.286 | BVI = 0.08 | |
| $k_h$ = 1851 md | $k_v$ = 145 md | $k_{sph}$ = 791 md |

Result of forward calculation (macroscopic model data):

| | | |
|---|---|---|
| $R_v$ = 22.0 Ohm m | $R_h$ = 14.3 Ohm m | |
| $\Phi$ = 0.286 | BVI = 0.08 | |
| $k_h$ = 1851 md | $k_v$ = 145 md | $k_{sph}$ = 791 md |

Figure 7A:
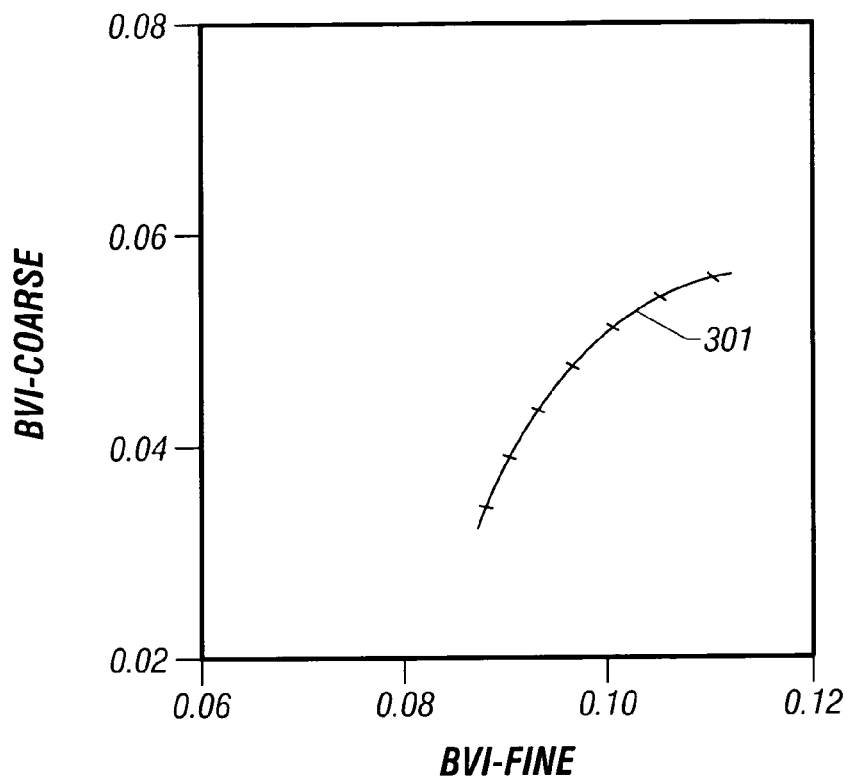
FIG. 7A shows possible solutions for the inversion of measured resistivity of a bimodal sand reservoir.

FIG. 7a shows the relationship between $BVI_c$ and $BVI_f$ for a range of assumptions of Vc between 0.1 and 0.6, i.e., all the solutions fit the measured resistivity values $R_v$ and $R_h$.

Figure 7B:
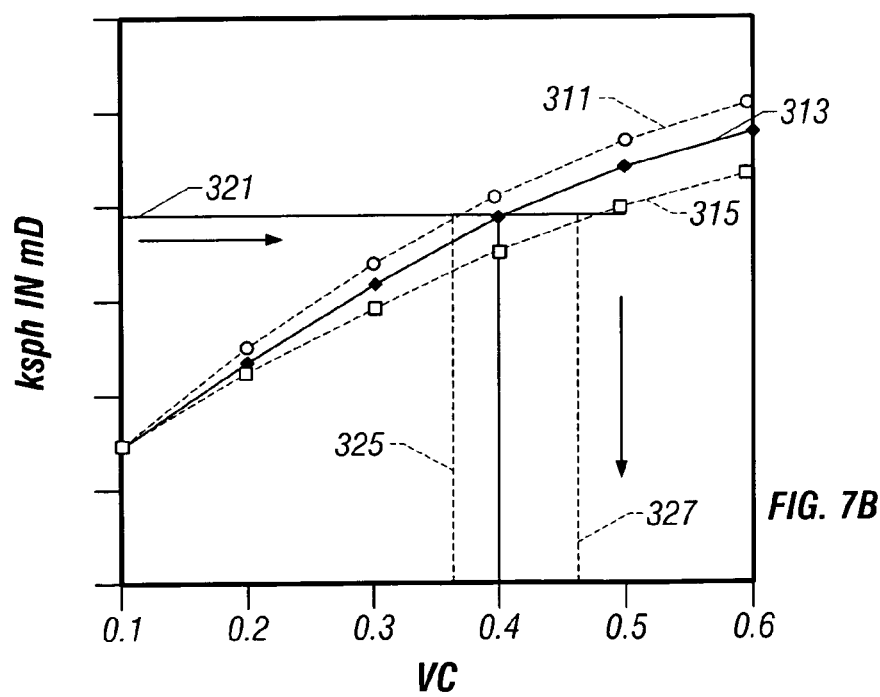
FIG. 7B shows the dependency of spherical permeability of a bimodal sand reservoir on the volume fraction of the coarse grained component.

Turning now to FIG. 7b, three curves 311, 313 and 315 are shown of the spherical permeability (ordinate) as a function of Vc. The three curves all have the same average porosity of 0.286 but the porosity in the coarse fraction is 0.33 for 315, 0.34 for 313 and 0.35 for 311. The range of values from 0.33 to 0.35 is a typical "noise" in the determination of porosity. A measured spherical porosity value is indicated by 321. It may be seen in FIG. 7b that a range of values between 325 and 327 for Vc are possible solutions to the inversion problem. Table I gives the corresponding reservoir properties.

TABLE I

Reservoir properties derived from combined analysis for three different porosity assumptions

| $\Phi_c$ | $V_c$ | $BVI_c$ | $k_c$ (md) | $k_h$ (md) | |
|---|---|---|---|---|---|
| $\Phi_f$ | $V_f$ | $BVI_f$ | $k_f$ (md) | $k_v$ (md) | $\lambda_k$ |
| 0.33 | 0.47 | 0.052 | 3318 | 1614 | 8.5 |
| 0.26 | 0.53 | 0.104 | 104 | 191 | |
| 0.34 | 0.40 | 0.050 | 4493 | 1850 | 13 |
| 0.25 | 0.60 | 0.100 | 88 | 145 | |
| 0.35 | 0.37 | 0.046 | 6619 | 2039 | 19 |
| 0.24 | 0.63 | 0.095 | 76 | 109 | |

It is worth noting that the determined permeability anisotropy (defined as a ratio of the horizontal to vertical permeability) ranges from 8.5 to 19. In comparison, the resistivity anisotropy, defined as the ratio of the vertical to horizontal resistivity, is (22.0/14.3)~1.54. Those versed in the art would recognize that a commonly used form of application of the Coates eqn. (26) is $$k = \left(100 \cdot \phi^2 \cdot \frac{\phi - BVI}{BVI}\right)^2 \tag{30}$$

For $BVI \ll \phi$, the result is $$k = 10^4 \cdot \frac{\phi^6}{BVI^2}. \tag{31}$$

When combined with empirical relationships of Klein between permeability and resistivity, the result is $$k_v = 10^4 \cdot \frac{\phi^6}{R_w} \cdot R_h \quad k_h = 10^4 \cdot \frac{\phi^6}{R_w} \cdot R_v \tag{32}$$

This would imply that the resistivity and permeability anisotropy are equal, in contradiction to the results derived here. This apparent paradox results from the combination of macroscopic model equations for laminated materials with microscopic empirical correlations between hydraulic connectivity and electrical resistivity.

While specific embodiments of the microresistivity tool and induction logging tool have been discussed above, it is to be understood that the tools may be used either on a wireline or in an MWD environment. It is to be further understood that the anisotropy measurements discussed above with reference to an induction logging tool may also be obtained using a propagation resistivity tool. Specifically, in a preferred embodiment of the invention, a transverse induction logging tool has been described for obtaining measurements indicative of horizontal and vertical resistivities of formation. In an alternate embodiment of the invention, the horizontal resistivities may be obtained by a conventional induction logging tool with a coil axis parallel to the borehole axis while vertical resistivities may be obtained from, measurements using a focused current logging tool. Such focused current logging tools would be known to those versed in the art and are not discussed further.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of petrophysical evaluation of an earth formation using a logging tool conveyed in a borehole in said formation, the method comprising:
   (a) obtaining a value of a horizontal and a value of a vertical resistivity of said earth formation using said logging tool; and
   (b) determining a horizontal and vertical permeability of said earth formation using the obtained horizontal resistivity and the obtained vertical resistivity, said horizontal permeability and said vertical permeability having a ratio different from a ratio of said vertical resistivity and said horizontal resistivity.

2. The method of claim 1 wherein said earth formation comprises a sand component and a shale component.

3. The method of claim 1 wherein determining said horizontal permeability and said vertical permeability further comprises determining a water content of said formation from said horizontal resistivity and said vertical resistivity.

4. The method of claim 3 wherein determining said horizontal permeability and said vertical permeability further comprises determining an estimate of bulk irreducible water content of the formation from NMR measurements.

5. The method of claim 3 wherein determining said water content of said formation further comprises:
   (i) inverting said value of horizontal resistivity and said vertical resistivity of the formation using a petrophysical model to give a first estimate of fractional volume of laminated shale in the formation;
   (ii) obtaining measurements of at least one of (A) a density, and (B) a neutron porosity of the formation, and using a volumetric model for deriving therefrom a second estimate of fractional volume of laminated shale; and
   (iii) inverting said horizontal resistivity and said vertical resistivity using a petrophysical model including said second estimate of fractional shale volume and obtaining therefrom a water content of the formation.

6. The method of claim 1 further comprising determining a vertical resistivity and a horizontal resistivity of an anisotropic sand component of the formation, and determining therefrom and from at least one additional measurement selected from the group consisting of: (i) NMR measurements of the formation, and, (ii) a bulk permeability of the sand component, a parameter of interest of a coarse and a fine grain portion of the sand component.

7. The method of claim 1 further comprising using a transverse induction logging tool for obtaining said value of horizontal resistivity and said value of vertical resistivity of the formation.

8. The method of claim 1 further comprising using an induction logging tool for obtaining said value of horizontal resistivity and a focused current logging tool for obtaining said value of vertical resistivity.

9. The method of claim 5 wherein using said volumetric model further comprises using at least one of: (i) the Thomas-Stieber model, and, (ii) the Waxman-Smits model.

10. The method of claim 1 further comprising determining a parameter of interest selected from the group consisting of: (A) a fractional volume of said coarse grain component, (B) a fractional volume of said fine grain component, (C) a water saturation of said coarse grain component, (D) a water saturation of said fine grain component, (E) a permeability of said coarse grain component, and, (F) a permeability of said fine grain component.

11. The method of claim 6 wherein the at least one additional measurement comprises an NMR measurement, and deriving the parameter of interest further comprises deriving a distribution of relaxation times from said NMR measurements and obtaining therefrom a distribution of components of said anisotropic sand.

12. The method of claim 6 wherein the at least one additional measurement comprises a bulk permeability measurement of the anisotropic sand and deriving the parameter of interest further comprises:
   A. obtaining a family of possible distributions of volume fractions and bulk irreducible water content (BVI) for the coarse and fine sand components;
   B. determining a horizontal permeability, a vertical permeability and a bulk permeability values associated with said family of possible distributions; and
   C. selecting from said family of possible distributions the one distribution that has a determined bulk permeability substantially equal to the measured bulk permeability.

13. The method of claim 12 wherein said bulk permeability is obtained from the group consisting of (I) NMR diffusion measurements, (II) a formation testing instrument, (III) a pressure buildup test and, (IV) a pressure drawdown test.

14. The method of claim 12 wherein determining the horizontal permeability value and the vertical permeability value associated with said family of distributions for the coarse and fine sand components further comprises using the Coates-Timur equation $$k = \left(\frac{\phi}{C}\right)^a \cdot \left(\frac{\phi - BVI}{BVI}\right)^b$$

where k is a permeability, $\phi$ is a porosity, BVI is the bound volume irreducible, and a, b, and C are fitting parameters.

15. The method of claim 12 wherein determining the horizontal permeability value, the vertical permeability value and the bulk permeability value further comprises using a relationship of the form $$k = C\phi^a T^b$$

where $k_e$ is a permeability, $\phi$ is a porosity and T is a NMR relaxation time, and a, b, and C are fitting parameters.

16. The method of claim 15 wherein T is a longitudinal NMR relaxation time.

17. The method of claim 12 wherein the coarse sand portion of the selected distribution is characterized by an irreducible water saturation less than an irreducible water saturation of the fine grain sand portion of the selected distribution.

18. The method of claim 12 wherein the determined bulk permeability is a spherical permeability related to the horizontal permeability value and the vertical permeability value by a relationship of the form $$k_{sph} = (k_h^2 k_v)^{\frac{1}{3}}.$$

* * * * *